United States Patent
Shedlock et al.

(10) Patent No.: US 11,079,499 B2
(45) Date of Patent: Aug. 3, 2021

(54) SCINTILLATING GLASS PIXELATED IMAGER

(71) Applicant: Varian Medical Systems, Inc., Palo Alto, CA (US)

(72) Inventors: Daniel Shedlock, Knoxville, TN (US); Josh M. Star-Lack, Palo Alto, CA (US); Adam Wang, Menlo Park, CA (US)

(73) Assignee: Varian Medical Systems, Inc., Palo Alto, CA (US)

(*) Notice: Subject to any disclaimer, the term of this patent is extended or adjusted under 35 U.S.C. 154(b) by 236 days.

(21) Appl. No.: 16/283,440

(22) Filed: Feb. 22, 2019

(65) Prior Publication Data
US 2019/0187301 A1    Jun. 20, 2019

Related U.S. Application Data

(62) Division of application No. 15/089,422, filed on Apr. 1, 2016, now Pat. No. 10,330,798.

(51) Int. Cl.
*G01T 1/20* (2006.01)
*G01T 1/24* (2006.01)

(52) U.S. Cl.
CPC .......... *G01T 1/2018* (2013.01); *G01T 1/2002* (2013.01); *G01T 1/247* (2013.01)

(58) Field of Classification Search
CPC ...... G01T 1/2018; G01T 1/2002; G01T 1/247
See application file for complete search history.

(56) References Cited

U.S. PATENT DOCUMENTS

| | | | | |
|---|---|---|---|---|
| 3,654,172 A * | 4/1972 | Reade | .................... | C03C 3/095 252/301.4 F |
| 5,108,959 A * | 4/1992 | Buchanan | ................. | C03C 3/15 250/483.1 |
| 5,120,970 A * | 6/1992 | Buchanan | ............... | C03C 3/062 250/483.1 |
| 5,122,671 A * | 6/1992 | Buchanan | ............... | C03C 3/062 250/363.01 |
| 5,391,320 A * | 2/1995 | Buchanan | ............... | C03C 3/062 252/301.4 F |
| 5,496,502 A * | 3/1996 | Thomson | ................. | G01T 1/203 250/361 R |
| 5,970,115 A * | 10/1999 | Colbeth | .................... | H04N 5/32 348/E5.081 |

(Continued)

*Primary Examiner* — Blake C Riddick
(74) *Attorney, Agent, or Firm* — Varian IP Legal

(57) ABSTRACT

In a method of making pixelated scintillators, a block of an amorphous scintillator material is divided into plural sections. The plural sections of the block are rejoined with plural first reflective septa to form an assembly. In the assembly, each of the plural first reflective septa separates two adjacent sections of the block. The assembly is then divided into plural sections in a way such that each of the plural sections of the block is divided into plural pixels. The plural sections of the assembly are rejoined with plural second reflective septa. Each of the plural second reflective septa separates two adjacent sections of the assembly, forming an array comprising plural rows and columns of pixels of the amorphous scintillator material. In the array, each pixel is separated from adjacent pixels by a portion of at least one of the plural first reflective septa and at least one of the second reflective septa.

15 Claims, 5 Drawing Sheets

(56) References Cited

U.S. PATENT DOCUMENTS

| | | | | |
|---|---|---|---|---|
| 6,541,774 B1* | 4/2003 | DeJule | G01T 1/2018 | 250/370.08 |
| 6,967,330 B1* | 11/2005 | Lempicki | C09K 11/7774 | 250/361 R |
| 7,157,014 B1* | 1/2007 | Andreaco | B29D 11/0074 | 216/24 |
| 7,291,842 B2* | 11/2007 | Zentai | G01T 1/24 | 250/370.09 |
| 7,816,651 B2* | 10/2010 | Green | G01T 1/28 | 250/370.01 |
| 8,204,171 B2* | 6/2012 | Ikhlef | A61B 6/42 | 378/4 |
| 8,552,386 B2* | 10/2013 | Morf | G01T 1/2018 | 250/363.01 |
| 2002/0079455 A1* | 6/2002 | Wieczorek | G01T 1/2018 | 250/367 |
| 2003/0021374 A1* | 1/2003 | Venkataramani | G01T 1/2018 | 378/19 |
| 2004/0042585 A1* | 3/2004 | Nagarkar | G21K 4/00 | 378/98.8 |
| 2004/0251420 A1* | 12/2004 | Sun | G01T 1/202 | 250/370.09 |
| 2005/0029462 A1* | 2/2005 | Lyons | G01T 1/1648 | 250/367 |
| 2005/0104000 A1* | 5/2005 | Kindem | G01T 1/1644 | 250/361 R |
| 2006/0054863 A1* | 3/2006 | Dai | C09K 11/02 | 252/301.4 R |
| 2007/0085010 A1* | 4/2007 | Letant | G01T 1/16 | 250/361 R |
| 2009/0294683 A1* | 12/2009 | Perna | H01L 31/02322 | 250/370.11 |
| 2010/0032578 A1* | 2/2010 | Levene | G01T 1/1644 | 250/370.11 |
| 2010/0127180 A1* | 5/2010 | Lifshitz | G01T 1/2002 | 250/367 |
| 2011/0110490 A1* | 5/2011 | Samant | G01T 1/20 | 378/63 |
| 2012/0223252 A1* | 9/2012 | Menge | G01T 1/1648 | 250/486.1 |
| 2012/0312995 A1* | 12/2012 | Morf | H01L 27/14663 | 250/363.01 |
| 2013/0034715 A1* | 2/2013 | Peng | C04B 35/63424 | 428/220 |
| 2013/0153776 A1* | 6/2013 | Wieczorek | G01T 1/2006 | 250/366 |
| 2013/0193331 A1* | 8/2013 | Perna | G01T 1/2002 | 250/366 |
| 2014/0110594 A1* | 4/2014 | Star-Lack | A61B 6/542 | 250/394 |
| 2014/0264043 A1* | 9/2014 | Ganguly | G01T 1/2006 | 250/362 |
| 2015/0003584 A1* | 1/2015 | Weisfield | G01T 1/2018 | 378/62 |
| 2015/0241570 A1* | 8/2015 | Perna | G01T 1/2002 | 250/366 |
| 2015/0331117 A1* | 11/2015 | Ho | G01T 1/2008 | 250/367 |
| 2016/0121139 A1* | 5/2016 | Da Silva Rodrigues | A61N 5/1071 | 600/1 |
| 2017/0131414 A1* | 5/2017 | Perna | G01T 1/2002 | |

* cited by examiner

SCINTILLATING GLASS PIXELATED IMAGER

TECHNICAL FIELD

Embodiments of this disclosure relate generally to x-ray imaging apparatuses and methods. In particular, various embodiments of methods of fabricating pixelated scintillators, image detectors containing pixelated scintillators, and radiation systems including portal imaging devices are described.

BACKGROUND

Electronic portal imaging devices (EPIDs) are known and traditionally used primarily in verification of patient setup and assessment of target and organ motion. With the advancement in digital imaging technologies, EPIDs have also developed into a tool for quality assurance of treatment machines and patient dosimetry.

Electronic portal imaging uses treatment beams having energy at megavolt (MV) levels to acquire images, and hence generally requires imagers having thick scintillators to effectively absorb x-rays. However, with increased thickness of scintillators, optical photons generated by absorbed x-rays may undergo extensive spreading or cross-talk, resulting in image blurring.

Pixelated scintillators, which can limit lateral spread of light photons, are developed. One conventional method of making pixelated scintillators uses crystalline scintillators such as cadmium tungstate ($CdWO_4$ or CWO), cesium iodide (CsI), and bismuth germanate ($Bi_4Ge_3O_{12}$ or BGO), etc. Crystalline scintillators are expensive. Crystalline scintillators are also difficult to process. For example, CWO has a cleave plane (010) that tends to break, chip or fracture during cutting, lapping or polishing. CsI is mildly hydroscopic, very soft, and susceptible to scratching and bending. Portal imagers built using this approach must minimize radiative cross talk to preserve spatial resolution. Radiative cross talk may be produced by scattering of Compton electrons between pixels, or off angle or scattered x-rays that transverse multiple pixels generating light in multiple pixels. Therefore, dense materials such as lead or tungsten typically are used to isolate pixels, resulting in very expensive imagers with a lower fill factor.

In another conventional method of making pixelated scintillators, scintillating glasses are built into scintillating fiber optic face plates (SFOPs) for mounting to a detector array. Pulling scintillating glasses into SFOPs may produce arrays of high resolution but at considerably increased costs. Moreover, there is significant light loss that can impede image quality. Some scintillating glasses may lose about 20 to 30 percent of their intrinsic scintillation light output when drawn into fiber optics. Furthermore, the geometry of a fiber optic may not be ideal for two reasons: the cladding reduces the fill factor and only light that is emitted within the critical angle for total internal reflection is collected and the numerical apertures of scintillating glasses tend to be low since the index of refraction of the core is similar to the index of refraction of the cladding. As a result, while these imagers are very high resolution, they may have reduced detective quantum efficiencies (DQEs) and may not produce enough light to be compatible with the readout electronics.

Another conventional method of making imagers uses gadolinium oxisulfide (GOS) screens with a copper buildup plate (Cu-GOS). GOS is ceramic and not optically clear. Therefore, GOS screens with copper buildup plates are limited in thickness. Because they are typically thin, most of x-rays having MeV energy levels simple pass through the imager. As a result, imagers using GOS screens with copper buildup plates generally have low DQEs.

SUMMARY

In exemplary embodiments, the disclosure provides electronic portal imaging devices (EPIDs) with high detective quantum efficiencies (DQEs), which use megavoltage (MV) radiotherapy treatment beams for image guidance. The disclosed EPIDs provide high quality beam's eye view imaging, CBCT metal artifact reduction, and combined MV-kV CBCT for reduced scan times.

In an exemplary embodiment, a thick pixelated scintillator array is coupled to an active matrix flat panel imager (AMFPI) to increase detector sensitivity. Past efforts have focused on using crystaline scintillator materials such as cadmium tungstate ($CdWO_4$ or CWO), cesium iodide (CsI), and bismuth germanate ($Bi_4Ge_3O_{12}$ or BGO) etc., which unfortunately are expensive and can be difficult to machine into pixels with high aspect ratios. In embodiments of the disclosure, amorphous scintillator materials such as scintillating glasses are used in making EPIDs. Amorphous scintillator materials are relatively easy to cut and polish, and significantly less costly since crystal growth is not required.

When performing full MV-CBCT using the disclosed EPIDs, the dose to patients is small with regard to the treatment dose, for example, less than 10 MU, or less than 5 MU. The incremental cost to build an EPID is less than adding full kV-CBCT. The DQEs of the disclosed EPIDs are sufficiently high to meet generally accepted imaging and dose requirements for imaging guided radiotherapy (IGRT), specifically enabling soft tissue imaging. The disclosed EPIDs are also sufficiently radiation-hard to withstand at least 1 kGy of dose without significantly decreasing DQEs. The emission of optical photons in the spectrum is compatible with amorphous silicon flat panel imagers.

In one aspect of the disclosure, a method of making pixelated scintillators is provided. According to the exemplary method, a block of an amorphous scintillator material is divided into plural sections. The plural sections of the block are rejoined with plural first reflective septa to form an assembly. In the assembly formed, each of the plural first reflective septa separates two adjacent sections of the block. The assembly is then divided into plural sections such that each of the plural sections of the block is divided into plural pixels. The plural sections of the assembly are then rejoined with plural second reflective septa. Each of the plural second reflective septa separates two adjacent sections of the assembly, forming an array comprising plural rows and columns of pixels of the amorphous scintillator material. In the array, each pixel is separated from adjacent pixels by a portion of at least one of the plural first reflective septa and at least one of the plural second reflective septa.

The amorphous scintillator material may be scintillating glass such as silicate or borate glass incorporated with a rare earth activator such as tetravalent terbium that scintillates. The amorphous scintillator material may comprise scintillating nanospheres having a size significantly less than a wavelength of light emitted by the scintillating nanospheres. In some embodiments, the amorphous scintillator material comprises poly vinyl toluene incorporated with a scintillating dopant material.

The first and second reflective septa may be same or different, and may respectively comprise a specular reflector such as aluminized polyethylene terephthalate (PET) or polyester. Alternatively, the specular reflector may comprise silver, gold, and aluminum.

In another aspect of the disclosure, an x-ray imager is provided. The exemplary x-ray imager comprises a pixelated scintillator layer configured to generate light photons from x-rays having energy at a megavolt level and a detector array configured to produce electrical signals from the light photons. The pixelated scintillator layer comprises plural rows and columns of pixels of an amorphous scintillator material, wherein each pixel is separated from adjacent pixels by a reflective septum.

The reflective septum may comprise a specular reflector such as aluminized polyethylene terephthalate (PET) or polyester.

The pixels of the amorphous scintillator material may be rectangular or square in cross-section. The pixelated scintillator layer may have a pixel pitch ranging from about 0.05 mm to about 40 mm. The pixelated scintillator layer may have an aspect ratio ranging from about 1:1 to about 50:1.

The detector array may be a thin film transistor (TFT) flat panel.

In a further aspect of the disclosure, a radiation system is provided. The exemplary radiation system comprises a radiation source operable to produce x-rays having energy at a megavolt level and an imaging device operable to acquire images using x-rays having energy at a megavolt level. The imaging device comprises a pixelated scintillator layer configured to generate light photons from x-rays having energy at a megavolt level and a detector array producing electrical signals from the light photons. The pixelated scintillator layer comprises plural rows and columns of pixels of an amorphous scintillator material, wherein each pixel is separated from adjacent pixels by a reflective septum.

In some embodiments, the radiation source is operable to produce x-rays having an energy level ranging from 4 to 25 MV. The radiation source and imaging device may be operable to conduct cone-beam computed tomography (CBCT).

This Summary is provided to introduce selected embodiments in a simplified form and is not intended to identify key features or essential characteristics of the claimed subject matter, nor is it intended to be used as an aid in determining the scope of the claimed subject matter. The selected embodiments are presented merely to provide the reader with a brief summary of certain forms the invention might take and are not intended to limit the scope of the invention. Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION

Various embodiments of methods of making pixelated scintillators, image detectors comprising pixelated scintillators, and radiation systems including electronic portal imaging devices are described. It is to be understood that the disclosure is not limited to the particular embodiments described as such. An aspect described in conjunction with a particular embodiment is not necessarily limited to that embodiment and can be practiced in any other embodiments.

Embodiments of the disclosure may be described with reference to the figures. It should be noted that some figures are not necessarily drawn to scale. The figures are only intended to facilitate the description of specific embodiments, and are not intended as an exhaustive description or as a limitation on the scope of the disclosure. Further, in the following description, specific details such as examples of specific materials, dimensions, processes, etc. may be set forth in order to provide a thorough understanding of the disclosure. It will be apparent to one of ordinary skill in the art that some of these specific details may not be employed to practice embodiments of the disclosure. In other instances, well known components or process steps may not be described in detail in order to avoid unnecessarily obscuring the embodiments of the disclosure.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise.

As used herein, the term "scintillator pixel," "pixelated scintillators," "pixelated scintillator array," or "pixelated scintillator layer" refers to embodiments where a scintillator piece is physically or optically isolated from adjoining scintillator pieces.

Methods of Fabricating Pixelated Scintillators

Figure 1:
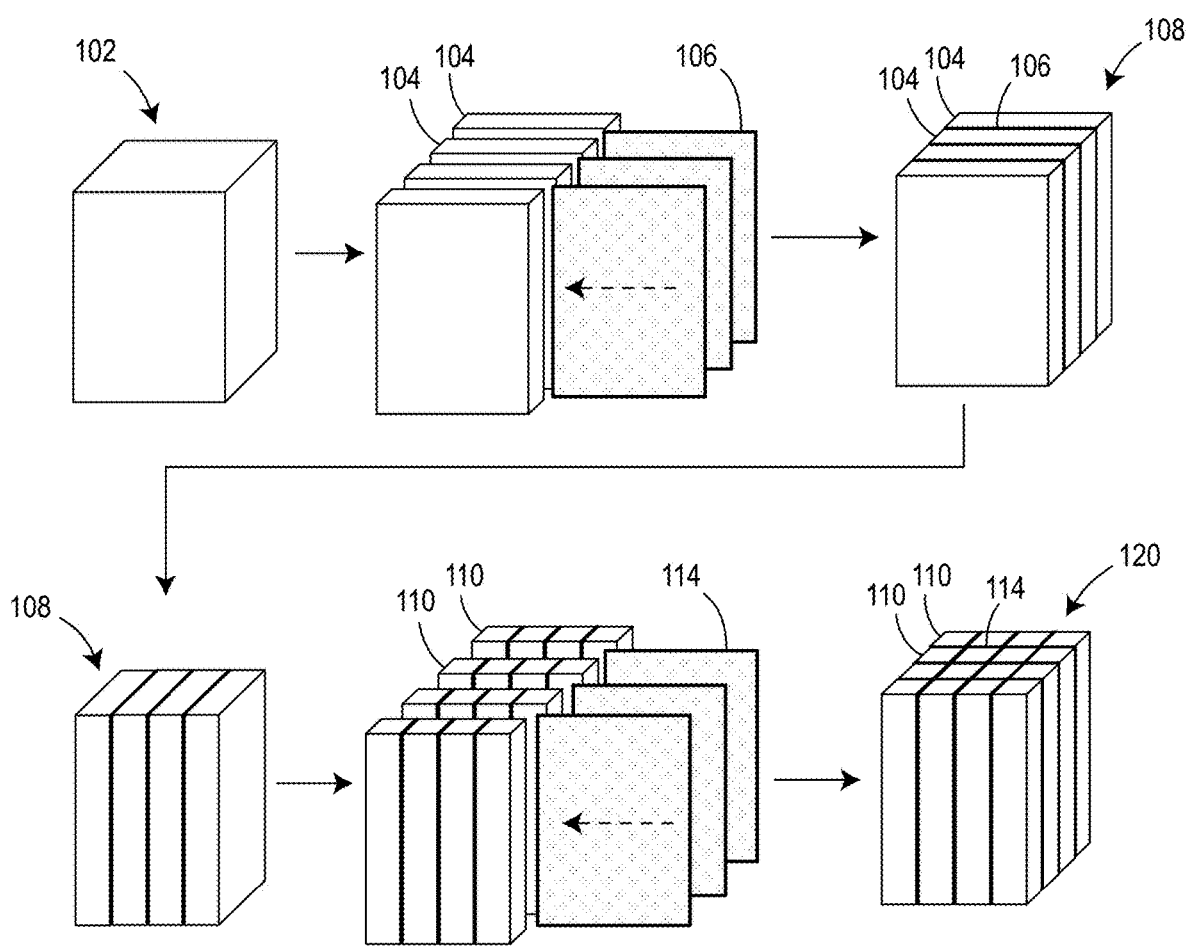
FIG. 1 schematically shows exemplary steps of a method of making pixelated scintillators according to embodiments of the disclosure.

FIG. 1 schematically shows exemplary steps of a method for fabricating a pixelated scintillator array according to embodiments of the disclosure. According to the exemplary method, a block of an amorphous scintillator material 102 is provided. The block of amorphous scintillator material 102 can be cut into plural thin slices or sections 104. The plural sections 104 are then rejoined with plural first reflective septa 106 to form an assembly 108 in which each of the plural first reflective septa 106 separates two adjacent sections 104 of the block 102. The plural first reflective septa 106 may be individual reflective layers as shown, which can be inserted between and bonded to the sections of the block using an adhesive. Alternatively, coatings of first reflective septa material may be applied to the plural sections of the block. The sections coated with the first reflective septa material can be then bonded together using an adhesive.

Still referring to FIG. 1, the assembly 108 is then further cut into plural sections 110. The assembly 108 may be cut in a way such that each of the plural sections 104 initially cut from the block 102 is divided into plural pixels. By way of example, the assembly 108 may be rotated in 90 degrees as shown and then cut in a direction orthogonal to the side surfaces of the plural sections 104 that are initially cut from the block 102.

The plural sections 110 of the assembly 108 are then rejoined with plural second reflective septa 114 to form an array 120. In the formed array 120, each of the plural second reflective septa 114 separates two adjacent sections 110 of the assembly 108. The plural second reflective septa 114 may be individual reflective layers as shown, which can be inserted between and bonded to the plural sections 110 of the assembly 108 using an adhesive. Alternatively, coatings of the second reflective septa material may be applied to the plural sections of the assembly. The coated sections can be then bonded together using an adhesive. The materials for the first and second reflective septa 106, 114 may be same or different.

Figure 2:
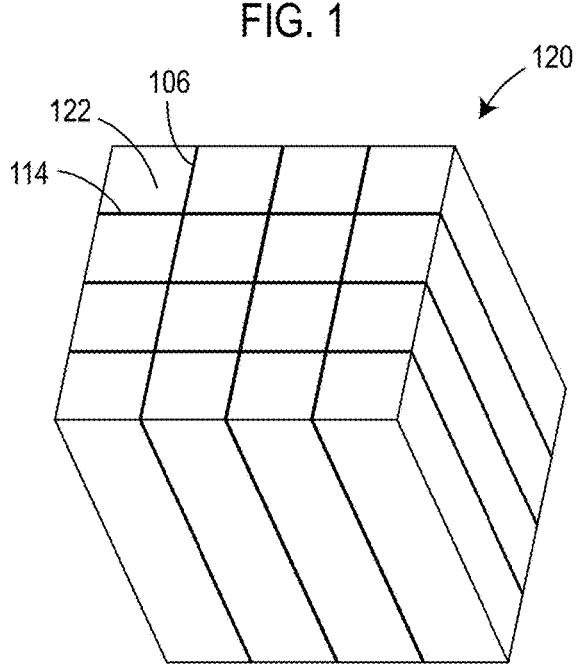
FIG. 2 schematically shows an exemplary pixilated scintillator array according to embodiments of the disclosure.

A final form of the array 120 includes plural rows and columns of pixels 122 of an amorphous scintillator material, as also shown in FIG. 2. As shown in FIG. 2, each pixel 122 is now separated from adjacent pixels by a portion of at least one of the plural first reflective septa 106 and by a portion of at least one of the second reflective septa 114.

Returning to FIG. 1, the starting raw material, the block of an amorphous scintillator material 102 can be provided in the form of a cube, prism, or any other suitable forms. By way of example, blocks of scintillating glasses measuring approximately 20 cm×12 cm×2.5 cm are commercially available. Suitable amorphous scintillator materials include and are not limited to borate and silicate glasses incorporated with rare earth metals such as cerium, terbium or the like. The incorporated rare earth metals may optimize the wavelength of the emitted light to the detector array. By way of example, terbium doped scintillators are typically in the green spectrum, around 550 nm, near the optimal level for amorphous silicon (a-Si) detector arrays. Other elements or compounds that can be incorporated in the borate or silicate glasses include gadolinium oxides, cerium oxides, or europium oxides, etc. By way of example, the scintillating borate or silicate glasses may include 1-20 percent of terbium oxides, 1-15 percent gadolinium oxides, and certain percent of other oxides. Other suitable ingredients such as stabilizers and flux etc. may also be included in the scintillator glasses. U.S. Pat. Nos. 5,108,959, 5,120,970, 5,122,671, and 5,391,320 disclose various silicate and borate scintillator glasses, the disclosures of all of which are incorporated herein by reference in their entirety.

Other suitable scintillator materials include scintillating nanoparticles embedded in an amorphous base material. The nanoparticles are preferably nanospheres having diameters smaller than the wavelength of the emitted light to reduce scatter centers and re-absorption. Plastic scintillator materials such as poly vinyl toluene (PVT) embedded with various scintillating dopants can also be used. In general, dopants in the amorphous base material control the emission spectra and decay time. Plastic scintillator materials are commercially available e.g. from Saint-Gobain of Hiram, Ohio, United States.

Still referring to FIG. 1, the block of amorphous scintillator material 102 may be cut into plural thin slices or sections using any suitable techniques. Precision cutting saws or wires may be used to ensure the thickness of slices and limit the amount of material to be removed. The side surfaces of the sections 104 may be polished using grinding or any other suitable techniques known in the art.

Still referring to FIG. 1, the plural sections 104 of the block 102 can be rejoined with plural first reflective septa 106 by bonding using an adhesive. By way of example, an adhesive may be applied to the side surfaces of the sections 104 of the block 102. The individual reflective septa 106 can be then inserted in between the plural sections 104 as shown. Alternatively, an adhesive may be applied to the side surfaces of individual reflective septa 106, which can then be inserted between and bonded with the plural sections 104. The plural sections 104 of the block 102 can be then rejoined with the plural first reflective septa 106 e.g. by compressing them together.

The reflective septa may comprise a specular reflector such as silver, gold, or aluminum. Some exemplary reflective septa include and are not limited to aluminized Mylar or polyethylene terephthalate (PET) or polyester commercially available. In alternative embodiments, the reflective septa comprise a diffuse reflector.

Any suitable adhesives known in the art with desired viscosity and optical properties may be used in bonding the reflective septa 106 with the plural sections 104 of the block 102. The viscosity of the adhesive is preferably low, such as about 20 rpm or 1,000 cP per ASTM D-1084. The adhesive material is preferably transparent to the visible light. Exemplary adhesives include but are not limited to anaerobic epoxy adhesives and two-part epoxy adhesives. The adhesive can be heat cured or light cured.

Still referring to FIG. 1, in further cutting the assembly 108 into plural sections 110, the cutting direction is orthogonal to the side surface of the plural sections 104 that are initially cut from the block 102. This allows each of the plural sections 104 of the block 102 to be "diced" or further divided into plural smaller pieces or pixels. By way of example, the assembly 108 may be rotated 90 degrees as shown and then cut by the same cutting tool cutting the initial block 102. Alternatively, the cutting tool may be rotated 90 degrees or a different cutting tool may be used so as to further cut the assembly 108 in a direction orthogonal to the side surface of the plural sections 104 of the block 102. Similar to the cutting of the initial block 102 into plural sections 104, the side surfaces of the sections 110 of the assembly 108 may be polished e.g. by grinding or using any other suitable techniques known in the art.

The plural sections 110 of the assembly 108 are rejoined with plural second reflective septa 114 to form an array 120. Similar to the rejoining of the plural sections 104 of the block 102 with plural first reflective septa 106, the plural second reflective septa 114 may be individual reflective layers which can be inserted in between the sections 110 of the assembly 108. An adhesive may be initially applied to the side surfaces of the sections 110 of the assembly 108 or to the individual second reflective layers 114. The plural sections 110 of the assembly 108 can be then rejoined with the plural second reflective septa 114 e.g. by compressing them together. Alternatively, coatings of second reflective septa material may be applied to the side surfaces of the plural sections 110 of the assembly 108 and then the coated sections 110 are bonded together using an adhesive. The materials for the second reflective septa 114 may be same as or different from the material for the first reflective septa 106. The adhesive used for bonding the second reflective septa 114 may be the same as or different from the adhesive used for bonding the first reflective septa 106.

The method described above provides for a pixelated scintillator array 120 comprising plural rows and columns of pixels 122 of an amorphous scintillator material, wherein each pixel is separated from adjacent pixels by a portion of at least one of the plural first reflective septa 106 and by a portion of at least one of the second reflective septa 114, as better shown in FIG. 2. The size and shape of the pixels 122 may be defined by the thickness of the sections 104 cut from the block 102 and the thickness of the sections 110 cut from the assembly 108. The pixel pitch may be defined by the combined thickness of the reflective septa and the adhesive layer between the sections 104 of the block 102 and between the sections 110 of the assembly 108.

By way of example for illustration purpose, the size of the pixels 122 may range from about 0.05 mm to about 40 mm. The pixel pitch of the array 120 may range from about 0.05 mm to about 40 mm. The aspect ratio of the scintillator array 120 (array thickness to pixel pitch) may range from about 1:1 to about 50:1. In an exemplary embodiment, a scintillator array was prepared having a thickness of 1.2 cm and a pixel pitch of 1.51 mm. It should be noted that the above specific details are provided for a thorough understanding of the disclosure. It will be apparent to one of ordinary skill in the art that some of these specific details may not be required to practice embodiments of the disclosure.

Pixelated Scintillators, X-Ray Imagers, and Imaging Systems

In another aspect, the disclosure provides pixelated scintillator arrays. FIG. 2 schematically shows an exemplary pixelated scintillator array 120 comprising plural scintillator pixels 122 arranged in plural rows and columns. For illustration purpose, sixteen (16) pixels in four rows and four columns (4×4) are shown. It is apparent to one of ordinary skill in the art that a pixelated scintillator array may include fewer or more than 16 pixels and the disclosure is not limited by the number of pixels. By way of example, a pixelated scintillator array may include 8 rows×8 columns (64) pixels, 16 rows×16 columns (256) pixels, or 32 rows×32 columns (1024) pixels, and so on. The pixelated scintillator array 120 may be used alone or combined with one or more same or similar arrays in a one- or two-dimensional configuration to form a pixelated scintillator layer with a larger number of pixels.

Each pixel 122 in the pixelated scintillator array 120 is separated from the adjoining pixels by reflective septa 106 or 114. The size of the pixels may range from about 0.05 mm to about 40 mm. The pixel pitch may range from about 0.05 mm to about 40 mm. The aspect ratio of the pixelated scintillator array 120 may range from about 1:1 to about 50:1. The pixels 122 may be rectangular, square, or hexagonal in cross-section.

The pixels 122 may comprise an amorphous scintillator material such as silicate or borate glasses incorporated with terbium oxides, scintillating nanoparticles embedded in an amorphous base material, and plastic scintillator materials such as poly vinyl toluene (PVT) embedded with various dopant materials. The reflective septa 106 and 114 respectively may comprise a same or different specular reflector such as silver, gold, aluminized Mylar or polyethylene terephthalate (PET) or polyester. Alternatively, the reflective septa 106 and 114 respectively may comprise a same or different diffuse reflector.

Figure 3:
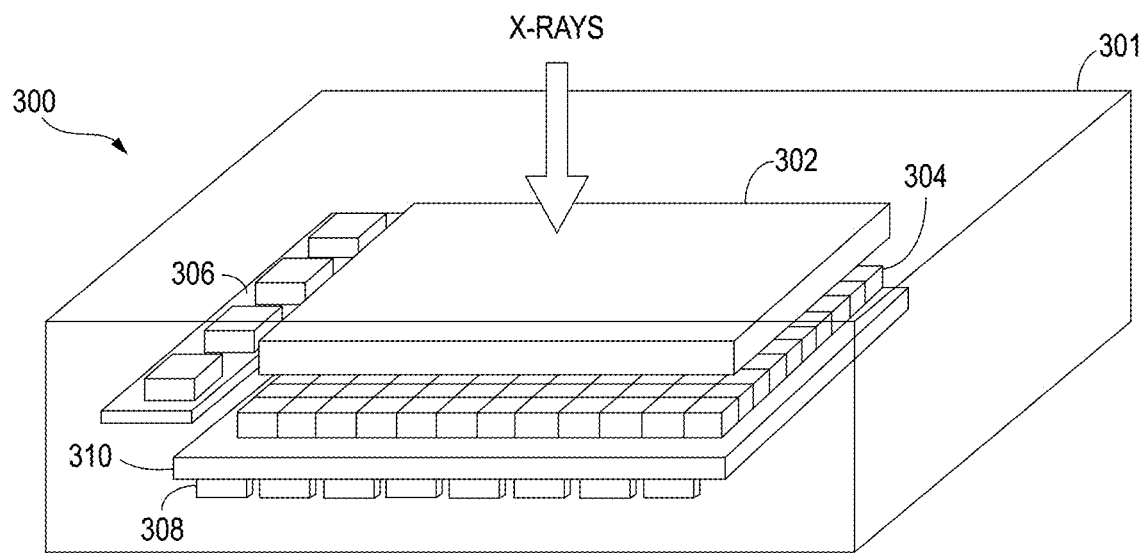
FIG. 3 schematically shows an exemplary x-ray imager according to embodiments of the disclosure.

In a further aspect, the disclosure provides x-ray image detectors. The x-ray image detectors can be advantageously used as electronic portal imaging devices (EPIDs) for imaging guided radiotherapy (IGRT) or full MV-CBCT. FIG. 3 schematically shows an exemplary x-ray image detector 300 according to embodiments of the disclosure. The x-ray image detector 300 includes a pixelated scintillator layer 302 and a detector array 304. The pixelated scintillator layer 302 generates light photons from x-ray radiation. The pixelated scintillator layer 302 may include one or more scintillator arrays 120 described above.

The detector array 304 converts light photons generated in the pixelated scintillator layer 302 to electrical signals. Various detector arrays are known and therefore their detailed description is omitted here in order to focus on description of embodiments of this disclosure. In general, a detector array may include a large number e.g. hundreds of thousands or millions of detector elements. The large number of detector elements may be arranged in a plurality of rows and a plurality of columns forming an active detector area. Each detector element may include an addressable photosensitive element such as a photodiode and a switching transistor such as a TFT or CMOS transistor.

The image detector 300 may also include a driver control 306 and a readout control 308. The driver control 306 provides control signals for addressing the signal data generated by the detector array 304. The readout control 308 provides control signals for reading out the signal data. In the exemplary embodiment shown in FIG. 3, the detector array 304 and the readout control assembly 308 are mounted on opposing sides of a base plate 310 to minimize the lateral size of the image detector 300. The driver control assembly 306 may also be placed beneath the detector array 304, or the readout control assembly 308 may be placed at a side of the detector array 304. A housing 301 encloses the pixelated scintillator layer 302, the detector array 304, the driver control assembly 306, and the readout control assembly 308. The image detector 300 may further include other electronics for amplifying, digitizing, and processing the electrical signals as known in the art. U.S. Pat. Nos. 5,970,115, 7,291,842, 7,816,651 and 8,552,386 disclose various embodiments of x-ray imaging apparatuses, systems, and electronic components thereof, the disclosures of all of which are incorporated herein by reference in their entirety.

Figure 4:
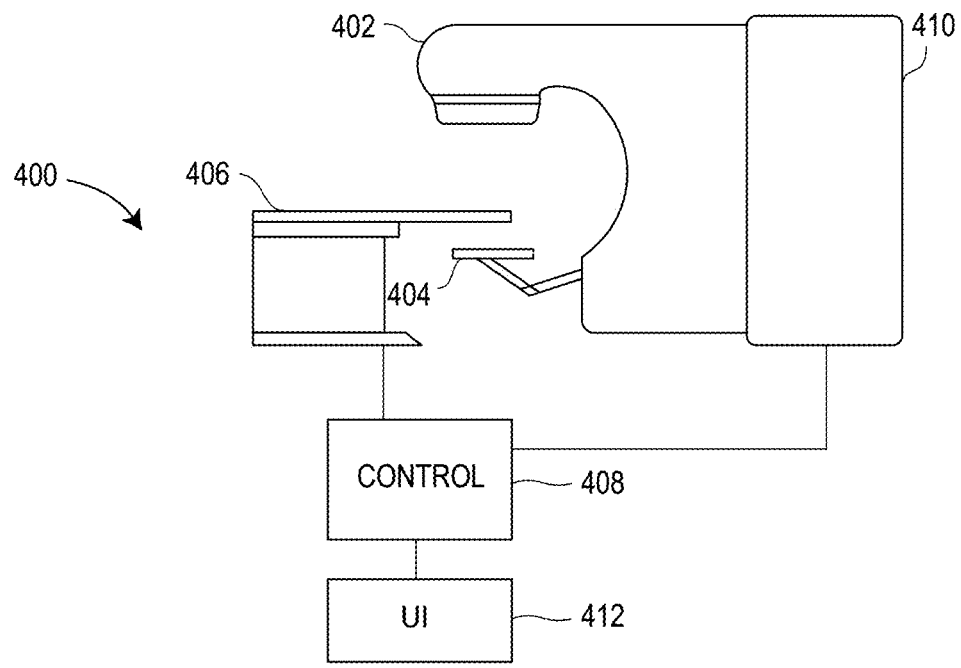
FIG. 4 schematically shows a radiation system including an electronic portal imaging device according to embodiments of the disclosure.

In a further aspect, the disclosure provides radiation systems including EPIDs. FIG. 4 schematically shows an exemplary radiation system 400. The radiation system 400 may include a gantry 402 enclosing a radiation source (not shown), an EPID 404, a patient support 406, and a control system 408. The radiation system 400 may optionally include a kV imaging system (not shown).

The gantry 402 may contain a radiation source (not shown) operable to produce radiation such as x-rays or other types of radiation. The radiation source may produce x-rays having an energy level in megavolts (MV) suitable for therapeutic treatment. The gantry 402 may also contain and support various other devices configured to shape, modulate, and monitor treatment beams. U.S. Pat. No. 8,077,830 issued Dec. 13, 2011 and entitled "Beam Filter Positioning Device" describes various embodiments of a radiation system, the disclosure of which is incorporated herein by reference in its entirety. The gantry 402 may be supported by a stand 410 and rotatable around a patient (not shown) supported on the patient support 406 to perform various form of radiotherapy, including intensity-modulated radiation therapy (IMRT), volumetric modulated arc therapy (VMAT), and image guided radiation therapy (IGRT).

The EPID 404 may be supported by the gantry 402 and rotated with the source (not shown) enclosed in the gantry 402. The EPID 404 may acquire images of the patient using radiation produced by the source enclosed in the gantry. The EPID 404 may be an x-ray image detector described above in conjunction with FIG. 3. The images acquired by the EPID may be processed using suitable algorithms and the reconstructed images may be presented in a 2D or 3D manner on a display. The 2D or 3D images may aid in patient setup and verification, assessment of treatment target and organ motion. The images may also aid in guiding treatment and monitoring treatment dose delivery.

The control system 408 may be located outside a treatment room, within which the gantry 402 and the patient support 406 are located. The control system 408 controls the operation of the radiation system 400, with a user interface 412. The control system 408 may include a computer comprising a memory and a processor. The memory may store programs for operating the radiation system 400, store treatment plan information including such as the nature of the tumor in the patient, the treatment dose to be delivered, and the position and/or movement of the gantry 402 relative to the patient etc. The processor may execute the treatment plan and other operation programs.

EXAMPLES

Pixelated scintillator arrays were fabricated using the methods described in the disclosure. Imagers including a pixelated scintillator array were constructed, and measurements of the imager DQEs and CNRs performed. Radiographic images were acquired using the imagers and CBCT images reconstructed.

In particular, pixelated scintillator arrays were fabricated using the exemplary method described in conjunction with FIG. 1. Commercially available solid blocks of scintillating glass, silicate based glasses doped with terbium (hereafter "LKH"), were used as the starting material. The fabricated scintillator array in its final form was 1.2 cm thick and 42.4 cm×42.4 cm wide and contained 78,400 pixels with a pixel pitch of 1.51 mm. The reflective septa material was 0.013 mm thick aluminized polyethylene terephthalate (aluminized Mylar). The adhesive layer was 0.007 mm thick, resulting in a fill factor of 98.3%. The pixelated scintillator array was mounted onto an ative matrix flat panel detector available from Varian Medical Systems, Inc. Palo Alto, Calif. The imager constructed is referred to as "Disclosed DMI" herein.

CBCT images of "Catphan600" phantom and radiographic images of"Las Vegas" phantom were acquired using a Truebeam® radiotherapy system available from Varian Medical Systems, Inc., operating at 6 MV. "Catphan600" phantom is commercially available from Phantom Laboratories, Salem, N.Y. "Las Vegas" phantom is commercially available from Varian Medical Systems, Inc. Measurements of imager DQE and CNR were performed using IEC methods.

Comparison images were acquired using commercially available digital megavoltage imager 43×43 EPID (hereafter "Standard DMI"). The Standard DMI employs a conventional lanex (133 mg/cm$^2$) scintillation screen coupled to a 1 mm thick Cu buildup plate (Cu-GOS).

Figure 5:
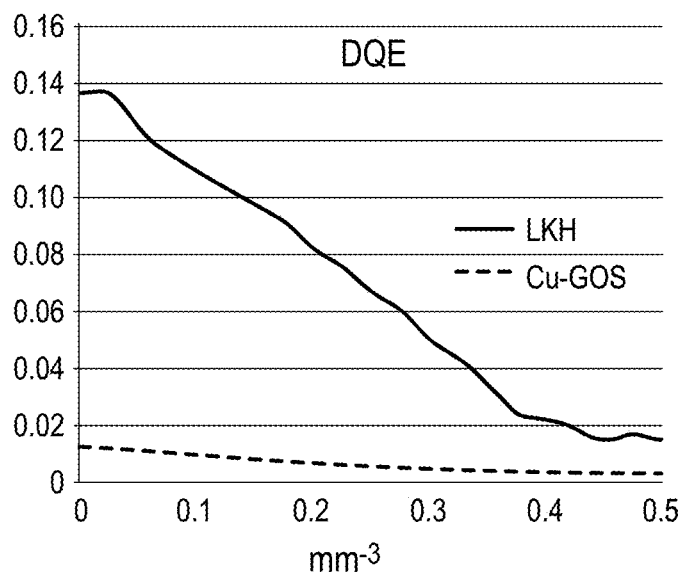
FIG. 5 is a plot showing improved DQE performance of an exemplary imager of the disclosure over a conventional imager.

FIG. 5 is a plot showing the improved detective quantum efficiency (DQE) of the imager of the present disclosure (LKH) over the conventional imager (Cu-GOS). As shown, the DQE (0) of the imager of the present disclosure (LKH) is about 13%, which is approximately 10 times higher than the DQE (0) of the conventional imager (Cu-GOS).

Figure 6:
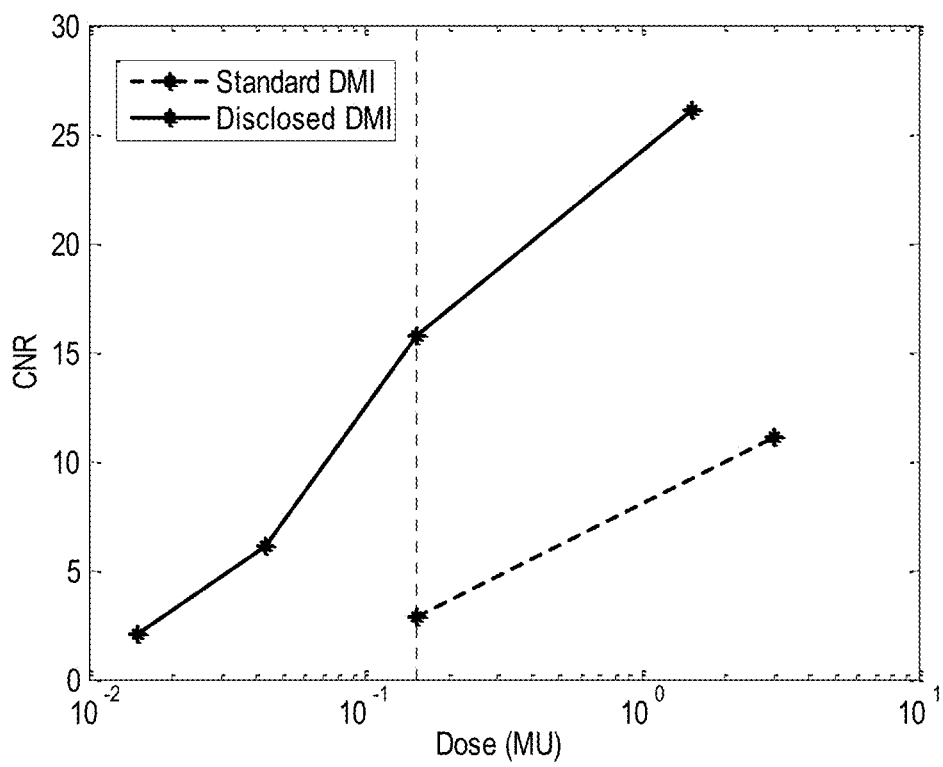
FIG. 6 is a plot showing improved contrast to noise ratio (CNR) property of an exemplary imager of the disclosure over a conventional imager.

FIG. 6 is a plot showing the improved contrast-to-noise ratio (CNR) of the imager of the disclosure over the conventional imager. As shown, the imager of the disclosure (Disclosed DMI) has a measured CNR about five times greater than that of the conventional imager (Standard DMI) at a same dose level, e.g., at 0.15 MU.

Figure 7:
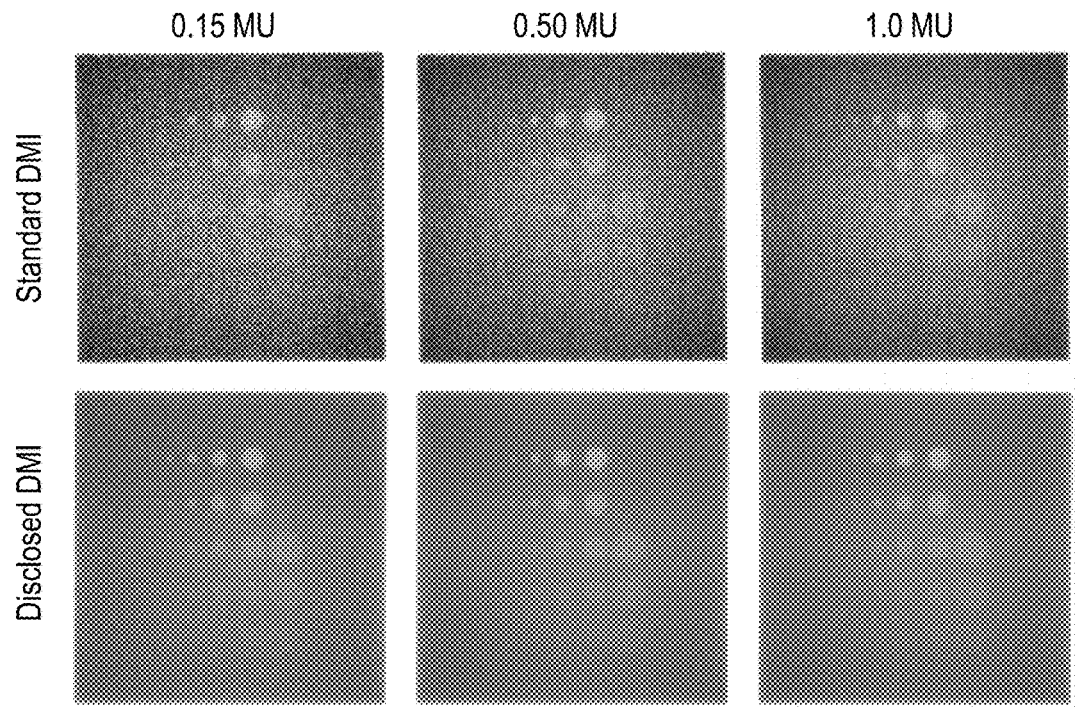
FIG. 7 shows 2D images acquired by an exemplary radiation system of the disclosure with improved contrast as compared with images acquired by a conventional radiation system.

FIG. 7 shows 2D images of "Las Vegas" phantom acquired by the imager of the disclosure and by the conventional imager respectively. A side-by-side comparison (at 0.15, 0.5, and 1.0 MU dose level respectively) shows that the images acquired by the imager of the disclosure (Disclosed DMI) have apparently better contrast than that of the images acquired by the conventional imager (Standard DMI).

Figure 8:
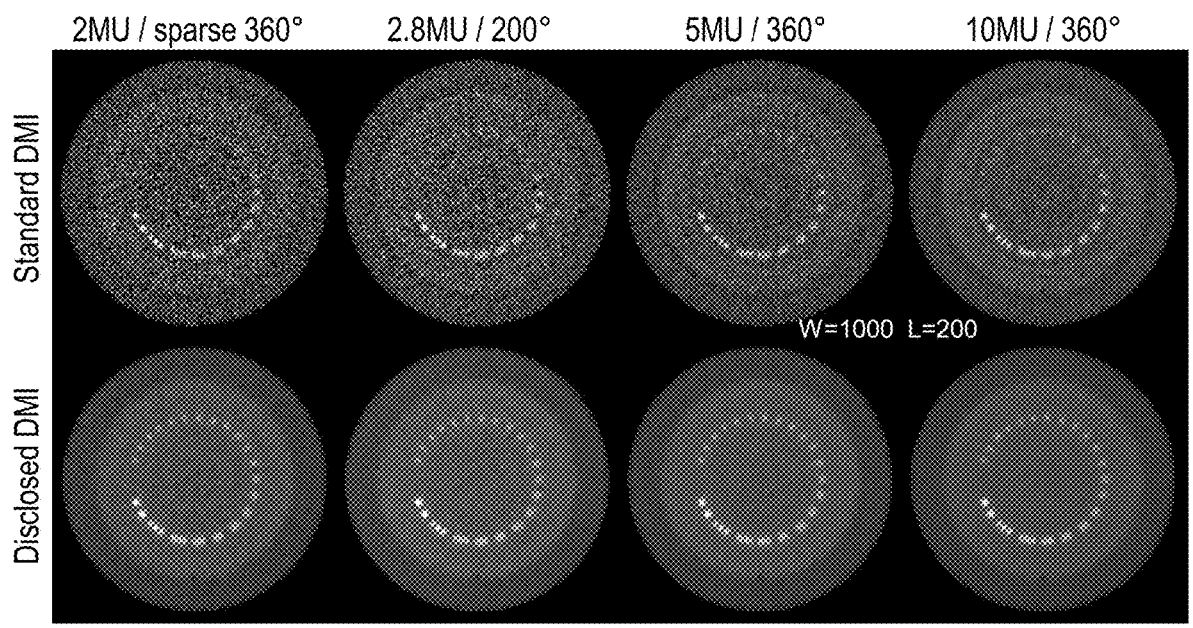
FIG. 8 shows 3D CBCT images acquired by an exemplary radiation system of the disclosure with improved contrast as compared with images acquired by a conventional system.

FIG. 8 shows 3D CBCT images reconstructed from images acquired by the imager of the disclosure and by the conventional imager respectively. A side-by-side comparison (at 2 MU/sparse 360°, 2.8 MU/sparse 200°, 5 MU/sparse 360°, 10 MU/sparse 360°) shows that the images acquired by the imager of the disclosure (Disclosed DMI) provide CBCT images with apparently better contrast than those provided by the conventional imager (Standard DMI).

Figure 9:
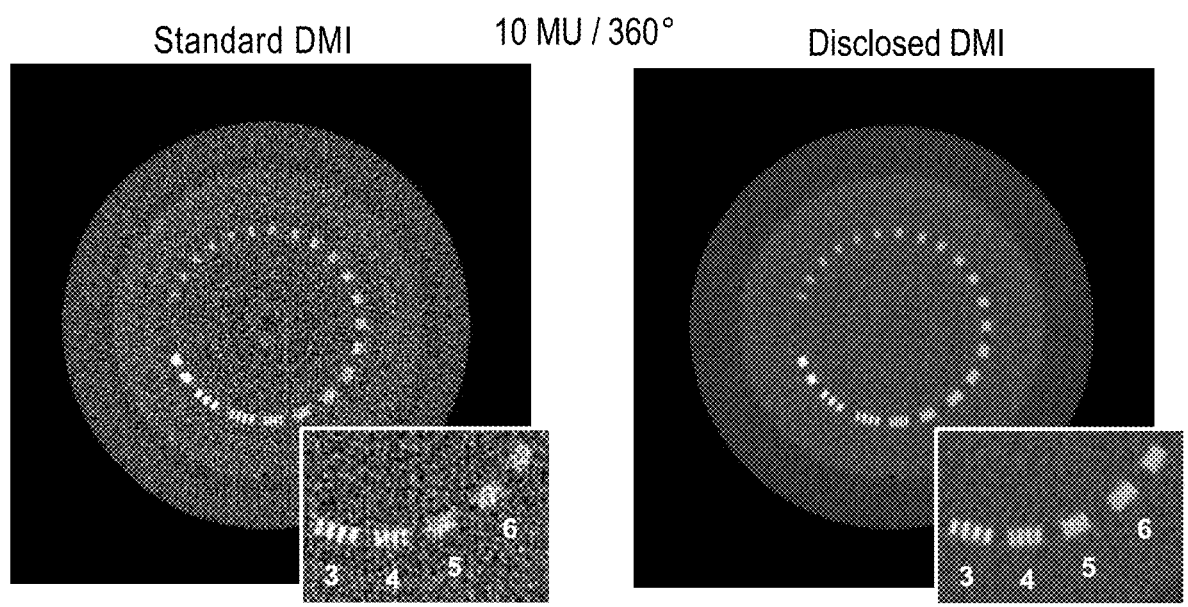
FIG. 9 shows images acquired by an exemplary radiation system of the disclosure with improved resolution as compared with images acquired by a conventional system.

FIG. 9 shows high-resolution reconstructions of "Catphan 600" phantom (data were acquired with a total of 10 MU/sparse 360°). The imager of the disclosure (Disclosed DMI) provides a limiting spatial resolution of 5 lp/cm or greater. The limiting resolution of the conventional imager (Standard DMI) is difficult to discern due to low SNR.

Methods of making pixelated scintillator arrays, image detectors including pixelated scintillators, and radiation systems comprising EPIDs have been described. Those skilled in the art will appreciate that various other modifications may be made within the spirit and scope of the invention. All these or other variations and modifications are contemplated by the inventors and within the scope of the invention.

What is claimed is:

1. An apparatus, comprising:
   a pixelated scintillator layer configured to generate light photons from x-rays having energy at a megavolt level; and
   a detector array configured to produce electrical signals from light photons,
   wherein the pixelated scintillator layer comprises one or more arrays each comprising plural rows and columns of pixels of an amorphous scintillator material having a thickness configured to interact with x-rays having energy at the megavolt level, wherein each pixel is separated from adjacent pixels by a reflective septum, wherein the pixelated scintillator layer has a pixel pitch, and an aspect ratio of the thickness to the pixel pitch ranging from 1:1 to 50:1.

2. The apparatus of claim 1, wherein the reflective septum comprises a specular reflector.

3. The apparatus of claim 1, wherein each of the pixels of the amorphous scintillator material is rectangular or square in cross-section.

4. The apparatus of claim 1, wherein the pixelated scintillator layer has a pixel pitch ranging from about 0.05 mm to about 40 mm.

5. The apparatus of claim 1, wherein the pixelated scintillator layer has an aspect ratio ranging from about 1:1 to about 50:1.

6. The apparatus of claim 1, wherein the detector array comprises a thin film transistor (TFT) flat panel.

7. The apparatus of claim 1, wherein the pixelated scintillator layer comprises more arrays arranged in a one-dimensional configuration.

8. The apparatus of claim 1, wherein the pixelated scintillator layer comprises more arrays arranged in a two-dimensional configuration.

9. A system, comprising:
a radiation source operable to produce x-rays having energy at a megavolt level; and
an imaging device operable to acquire images using the x-rays produced by the radiation source, wherein the imaging device comprises:
a pixelated scintillator layer configured to generate light photons from the x-rays produced by the radiation source; and
a detector array producing electrical signals from the light photons,
wherein the pixelated scintillator layer comprises plural rows and columns of pixels of an amorphous scintillator material having a thickness configured to interact with x-rays having energy at the megavolt level, and wherein each of the pixels is separated from adjacent pixels by a reflective septum, and the pixelated scintillator layer has a pixel pitch, and an aspect ratio of the thickness to the pixel pitch ranging from 1:1 to 50:1.

10. The system of claim 9, wherein the radiation source and the imaging device are operable to conduct cone-beam computed tomography (CBCT).

11. The system of claim 9, wherein the radiation source is operable to produce x-rays having an energy level ranging from 4 to 25 MV.

12. The system of claim 9, wherein the reflective septum comprises a specular reflector.

13. The system of claim 12, wherein the specular reflector comprises aluminized polyethylene terephthalate (PET) or polyester.

14. The system of claim 9, wherein the pixelated scintillator layer has a pixel pitch ranging from about 0.05 mm to about 40 mm.

15. The system of claim 9, wherein the pixelated scintillator layer has an aspect ratio ranging from about 1:1 to about 50:1.

* * * * *